United States Patent [19]
Yamada et al.

[11] 4,368,956
[45] Jan. 18, 1983

[54] COMPACT PHOTOGRAPHIC OBJECTIVE

[75] Inventors: Yasuyuki Yamada, Tokyo; Kikuo Momiyama, Yokohama, both of Japan

[73] Assignee: Canon Kabushiki Kaisha, Japan

[21] Appl. No.: 218,576

[22] Filed: Dec. 22, 1980

[30] Foreign Application Priority Data

Dec. 27, 1979 [JP] Japan .................. 54-172405

[51] Int. Cl.$^3$ .................. G02B 3/04; G02B 9/34
[52] U.S. Cl. .................. 350/432; 350/469
[58] Field of Search .................. 350/469, 465, 432

[56] References Cited
U.S. PATENT DOCUMENTS

| 2,446,402 | 8/1948 | Aklin | 350/469 |
| 3,951,523 | 4/1976 | Nishimoto | 350/432 |
| 4,204,747 | 5/1980 | Imai | 350/465 X |

FOREIGN PATENT DOCUMENTS

| 1269133 | 4/1972 | United Kingdom | 350/469 |
| 2036366 | 6/1980 | United Kingdom | 350/469 |

*Primary Examiner*—John K. Corbin
*Assistant Examiner*—Scott J. Sugarman
*Attorney, Agent, or Firm*—Toren, McGeady & Stanger

[57] ABSTRACT

The objective disclosed includes, from front to rear, a positive meniscus lens of forward convexity, a negative lens, a positive lens, and a negative meniscus lens having an aspheric front surface concave toward the front, and fulfills the following requirements:

$$-1.5f < fA < -0.5f$$

$$4.5 \times 10^{-4} < \left| \frac{\Delta x(0.7\eta)}{f} \right| < 4.0 \times 10^{-3}$$

$$6.5 \times 10^{-5} < \left| \frac{\Delta x(0.5\eta)}{f} \right| < 1.0 \times 10^{-3}$$

where
f is the focal length of the entire system;
fA is the focal length of the air lens defined by the opposing surfaces of the first and second lenses counting from the front; and

$$x(y) = \frac{(1/\eta^*)y^2}{1 + \sqrt{1 - (y/\eta^*)^2}} + a_1y^2 + a_2y^4 + a_3y^6 + \ldots$$

$$+ b_1y^3 + b_2y^5 + \ldots - \frac{(1/\eta)y^2}{1 + \sqrt{1 - (y/\eta)^2}}$$

wherein
$r_7$ is the paraxial radius of curvature of the front surface of the 4th lens; and
$r_7^*$ is the radius of curvature of the lens reference spherical surface defined by $$\eta = \frac{1}{1/\eta^* + 2a_1}$$

5 Claims, 21 Drawing Figures

COMPACT PHOTOGRAPHIC OBJECTIVE

BACKGROUND OF THE INVENTION

1. Field of the Invention

This invention relates to lens systems of short total length (from the first surface of the lens to the focal plane) and more particularly to compact wide angle photographic objectives.

2. Description of the Prior Art

Recently, the trend toward minimizing the bulk and size of the camera has increased demands for compact lenses or objective lenses with shortened total lengths. When the total length of a lens system is reduced to less than one times the focal length, it is particularly desirable to make the front lens group of the lens system of a positive refractive power and the rear lens group of a negative refractive power. Such power distribution has found many uses in long lenses with narrow angular fields of view. However, there are a few examples of the application of this principle to objectives having wide angles at least 60° with large aperture ratios and short total lengths.

The reason for this deficiency is that this type of refractive power distribution increases the residual distortion and astigmatism objectionably, or produces extremely large comas and halo, as the total length decreases, the relative aperture increases and the angular field of view widens.

Japanese Patent Application Publication No. Sho 44-10831 discloses a lens system using this type of power distribution. However, the system described therein exhibits a field angle of 46°, that is, in the order of a standard lens. If an attempt is made to increase the angular field, the astigmatic difference will increase. U.S. Pat. No. 3,998,527 (Japanese Patent Application Publication No. Sho 52-48011) discloses a similar lens system. However, here the F number is 1:4.5.

SUMMARY OF THE INVENTION

It is an object of the present invention to minimize the number of constituent lens elements and shorten the total length of lens systems and to provide a compact faster wide angle objective lens with four elements constituting four components. In embodiments of the present invention to be described more fully later, an angular field of view of 59.7° with F/2.8 and 63.4° with F/3.5 has been achieved.

DETAILED DESCRIPTION OF THE PREFERRED EMBODIMENTS

The present invention is to provide an objective comprising, from front to rear, a positive meniscus 1st lens component convex toward the front, a negative 2nd component, a positive 3rd component and a negative meniscus 4th component with its front aspheric surface concave toward the front, wherein letting f denote the focal length of the entire system and fA the focal length of the air lens forms in a separation between the 1st and 2nd components, the following requirement (1) is fulfilled:

$$-1.5f < fA < -0.5f \quad (1)$$

Further, taking the axial direction as the x-axis and the direction perpendicular to the optical axis as the y-axis, stipulating that the quantity measured in a direction in which the light progresses shall have the positive sign, and locating the original point at the intersection of the vertex of the front surface of the 4th component and the x-axis, the difference $\Delta x$ between the aspheric surface and a spherical surface assumed to have a radius of curvature equal to that of curvature of the paraxial region of the aspheric surface which contributes to the determination of the focal length is expressed by the following formula:

$$\Delta x = \frac{\left(\frac{1}{r_7^*}\right) y^2}{1 + \sqrt{1 - \left(\frac{y}{r_7^*}\right)^2}} + a_1 y^2 + a_2 y^4 + a_3 y^6 + \ldots$$

$$+ b_1 y^3 + b_2 y^5 + \ldots - \frac{\left(\frac{1}{r_7}\right) y^2}{1 + \sqrt{1 - \left(\frac{y}{r_7}\right)^2}}$$

where $r_7$ is the radius of curvature of the paraxial region of the front surface of the 4th lens component;

$r_7^*$ is the radius of the curfature of the reference spherical surface of the lens defined by the following formula:

$$r_7 = \frac{1}{\frac{1}{r_7^*} + 2a_1}$$

$a_i$ is the coefficient of the i-th even-numbered power term; and $b_i$ is the coefficient of the i-th odd-numbered power term. Then, letting $\Delta x(0.7r_7)$ denote the value of $\Delta x$ at the height $r_7 \times 0.7$ in y coordinate and $\Delta x(0.5r_7)$ the value of $\Delta x$ at the height $r_7 \times 0.5$, the following requirements (2) and (3) are fulfilled $$4.5 \times 10^{-4} < \left|\frac{\Delta \times (0.7r_7)}{f}\right| < 4.0 \times 10^{-3} \quad (2)$$

$$6.5 \times 10^{-3} < \left|\frac{\Delta \times (0.5r_7)}{f}\right| < 1.0 \times 10^{-3} \quad (3)$$

In this embodiment the 1st to 4th lens components take the form of a positive meniscus lens, a bi-concave lens, a bi-convex lens and a negative meniscus lens respectively.

The significance of each of these inequalities is as follows. When the lower limit of inequality (1) is exceeded, under-correction of spherical aberration results, and the astigmatic difference also increases, resulting in strong inward coma, and the transverse chromatic aberration also increases in the negative sense. When the upper limit is exceeded, over-correction of sagittal image surface results and the astigmatic difference also increases, resulting in strong halo, and the longitudinal chromatic aberration also increases in the negative sense. Therefore, in order to obtain a compact lens system which is well corrected for spherical aberration and astigmatism while keeping coma and halo and further longitudinal and transverse chromatic aberrations to a minimum, it is, of importance to fulfil requirement (1).

Requirement (2) has a particular concern with aberration correction of the marginal zone of the angular field of view.

A lens system with the negative meniscus lens at a rear position as in the present invention, is subject to deterioration of astigmatism in the negative sense as a result of this negative meniscus lens. This causes the production of positive distortion, inward coma and halo. Requirement (2) is to compensate for such deterioration of astigmatism, positive distortion, inward coma and halo. That is, when $|\Delta x(0.7r_7)/f|$ exceeds the lower limit, though the positive distortion and halo can be compensated for, over-correction of sagittal image surface results and strong inward coma is also produced. When the upper limit is exceeded, though correction of coma is possible, sufficient correction of positive distortion becomes impossible. To achieve a good state of correction of the aberrations at the marginal zone of the angular field of view, therefore it is important to fulfil requirement (2).

Requirement (3) concerns aberration correction particularly in the middle zone of the angular field of view.

That is, when $|\Delta x(0.5r_7)/f|$ exceeds the lower limit, under-correction of meridional image surface results and the astigmatic difference also increases, thereby causing strong inward coma. When the upper limit is exceeded, under-correction of spherical aberration results and halo is produced at the middle zone of the angular field of view. To achieve a good state of correction of the aberration at the middle zone, therefore, it is important to fulfil requirement (3).

The use of synthetic resin in making the 4th or aspherical lens can provide an inexpensive photographic objective.

Fulfillment of the following additional requirements (I) and (II) facilitates a shortening of the lens system while simultaneously maintaining the good state of correction of the image aberrations.

$$0.6 < \frac{F_{123}}{|F_4|} < 1.1 \quad (I)$$

$$0.1 < \frac{D_6}{f} < 0.25 \quad (II)$$

where
- $F_{123}$ is the overall focal length of the 1st, 2nd and 3rd lens components;
- $F_4$ is the focal length of the 4th lens component; and
- $D_6$ is the axial air separation between the 3rd and 4th lens components.

When the lower limit of inequality (I) is exceeded, the refractive power of the front group of the 1st, 2nd and 3rd lens components becomes too strong relative to the refractive power of the rear group, composed of the 4th lens component to shorten the back focal length. Therefore, the total length of the lens system cannot be shortened. When the upper limit is exceeded, under-correction of spherical aberration results, and the astigmatic difference also increases, thereby causing the production of strong halo.

With the total length of the lens system shortened, when the lower limit of inequality (2) is exceeded, sagittal image surface is over-corrected in the marginal zone and under-corrected in the middle zone, and the astigmatic difference also increases. This causes strong inward coma. When the upper limit is exceeded, spherical aberration is under-corrected, which causes the production of extremely large halo.

Figure 1:
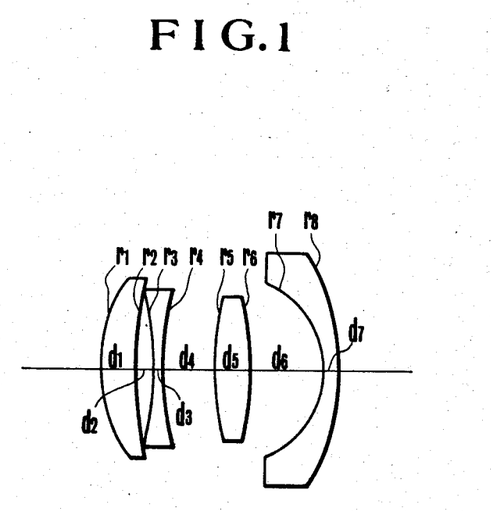
FIG. 1 is a longitudinal sectional view of an embodiment of an objective according to the present invention.
Figure 2A:
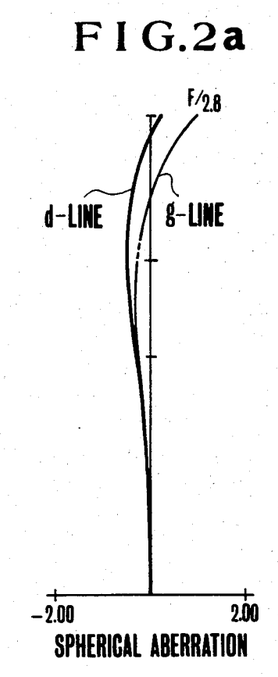
FIGS. 2(a), (b), (c) and (d) are graphic representations of the various aberrations of Example 1 of the objective.
Figure 2B:
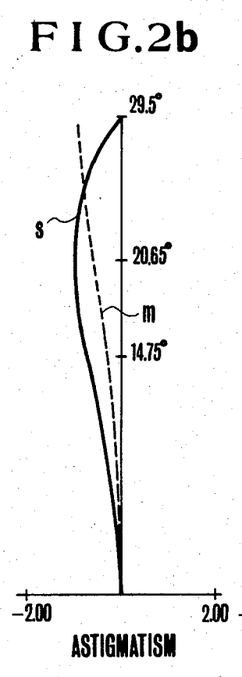
Figure 2C:
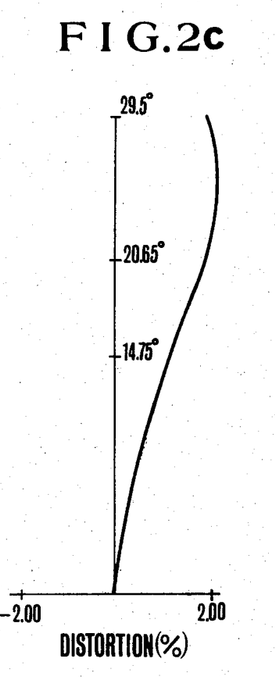
Figure 2D:
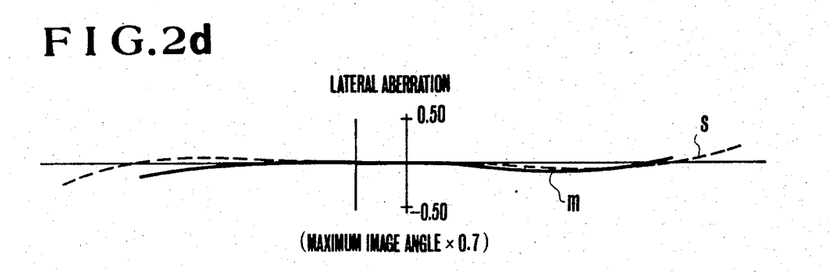
Figure 3A:
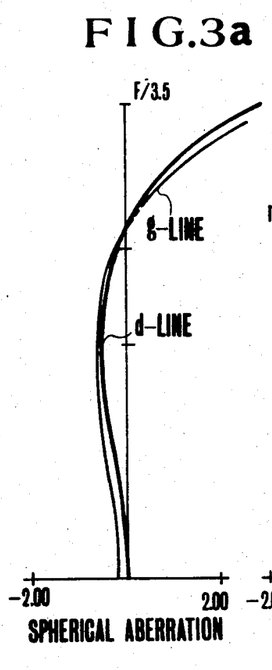
FIGS. 3(a), (b), (c) and (d) are graphic representations of the various aberrations of Example 2 of the objective.
Figure 3B:
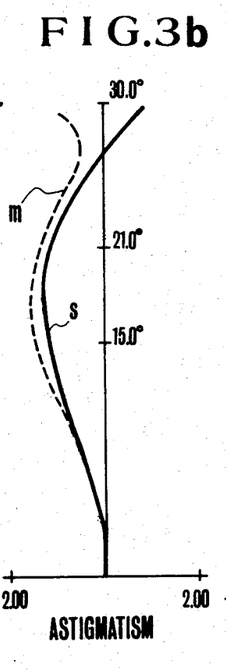
Figure 3C:
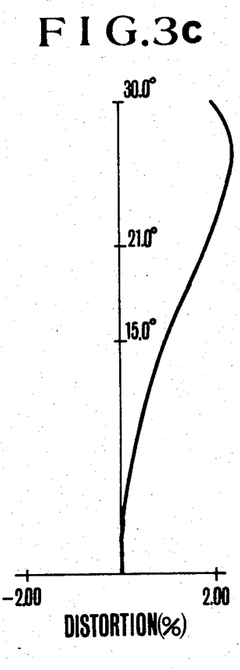
Figure 3D:
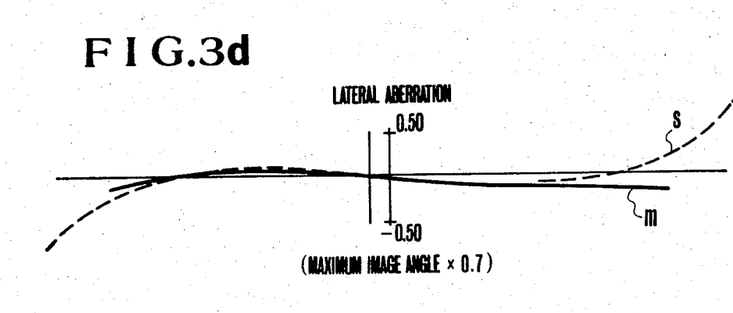
Figure 4A:
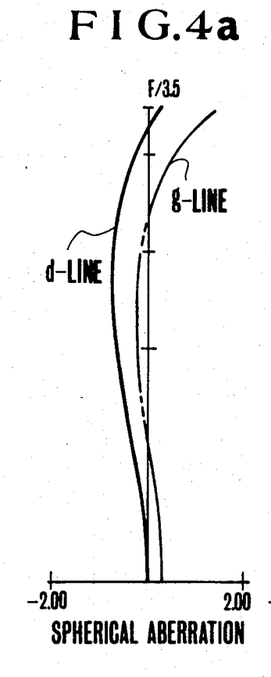
FIGS. 4(a), (b), (c) and (d) are graphic representations of the various aberrations of Example 3 of the objective.
Figure 4B:
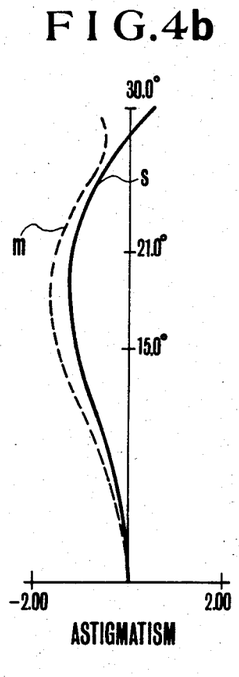
Figure 4C:
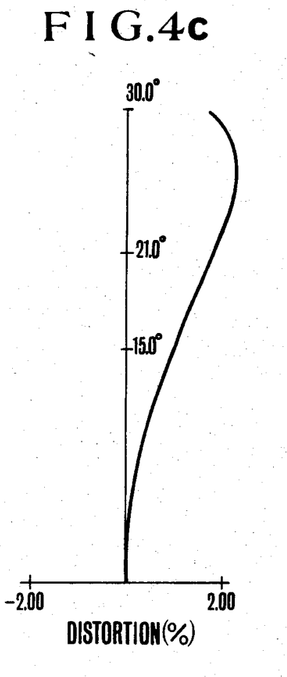
Figure 4D:
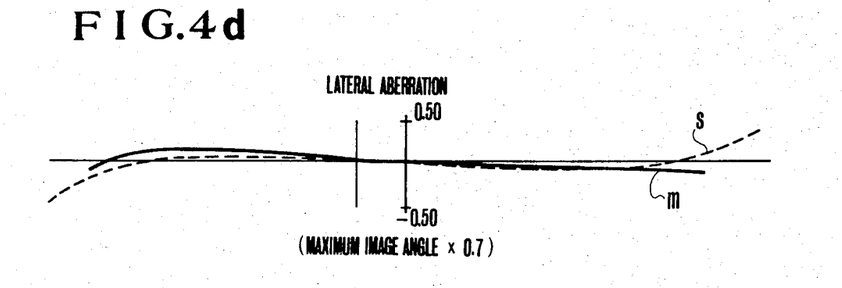
Figure 5A:
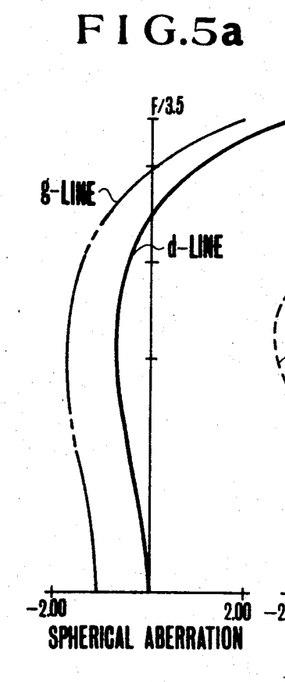
FIGS. 5(a), (b), (c) and (d) are graphic representations of the various aberrations of Example 4 of the objective.
Figure 5B:
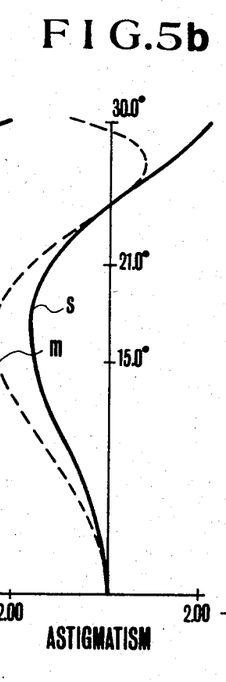
Figure 5C:
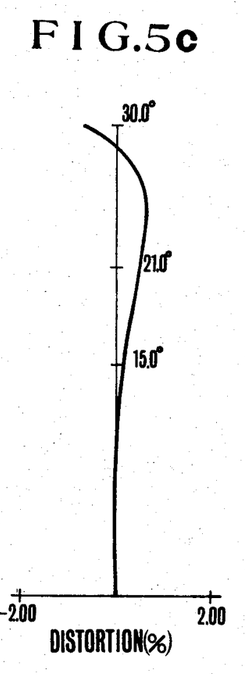
Figure 5D:
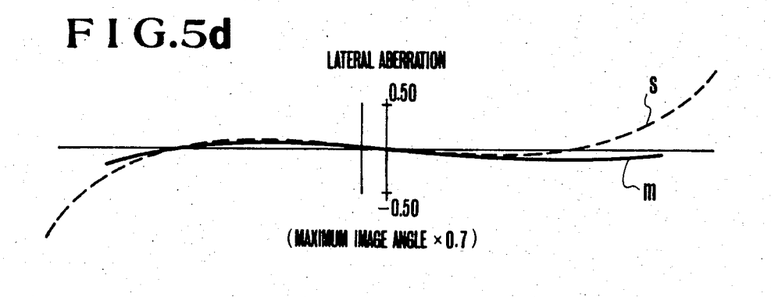
Figure 6A:
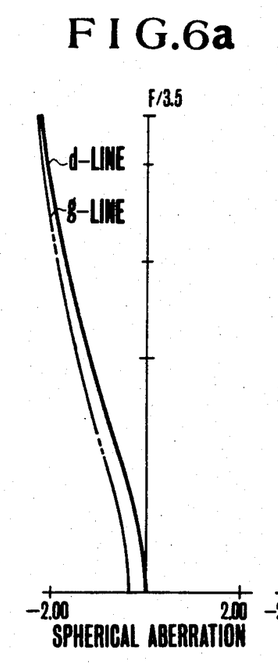
FIGS. 6(a), (b), (c) and (d) are graphic representations of the various aberrations of Example 5 of the objective.
Figure 6B:
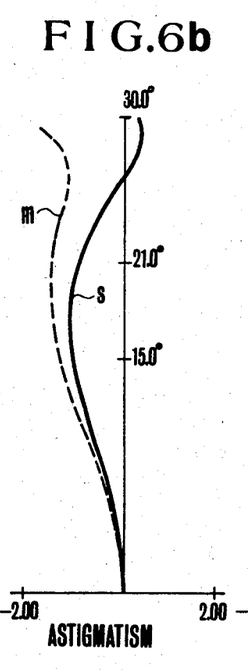
Figure 6C:
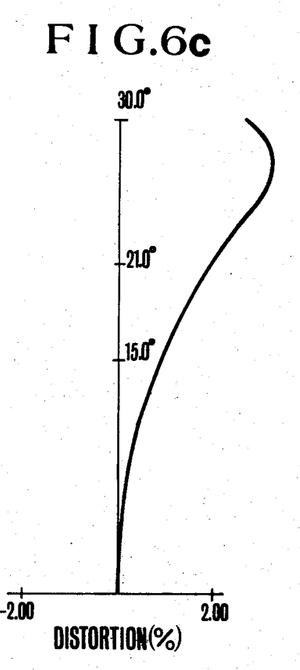
Figure 6D:
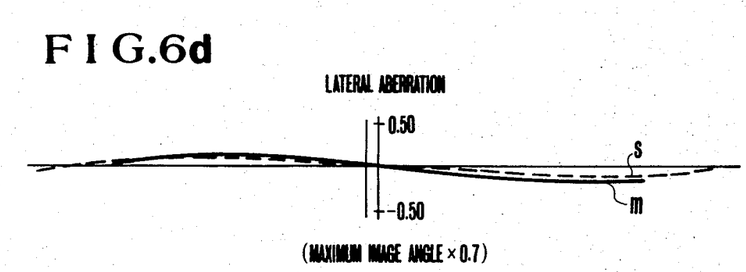

Five examples of specific objectives can be constructed in accordance with the numerical data given in the following tables. Example 1 of the specific objective is depicted in longitudinal section in FIG. 1. The spherical aberration, astigmatism, distortion and lateral aberration of the objective of FIG. 1 are graphically represented in FIG. 2. Examples 2 to 5 have these aberrations shown in FIGS. 3 to 6 respectively.

In the tables, r are the radii of curvature of the paraxial regions of the various lens surfaces; $r_7^*$ the radius of curvature of the reference spherical surface for the aspheric surface satisfying the following equation: $r_7 = 1/(1/r_7^* + 2a_1)$; d the axial thicknesses and air separations between the successive lens surfaces; n the indices of refraction for the spectral d-line of the glasses of which the various lens elements are made up; $\nu$ the Abbe numbers of the glasses of which the various lens elements are made up; ai the even coefficients of the aspheric surface; and bi the odd coefficients of the aspheric surface.

EXAMPLE 1

| Focal Length f = 100 | | F-number = 1:2.8 | |
|---|---|---|---|
| Image Angle 2ω = 59.7° | | Back Focal Length = 44.592 | |
| $r_1 = 32.515$ | | | |
| | $d_1 = 7.431$ | $n_1 = 1.77250$ | $\nu_1 = 49.60$ |
| $r_2 = 138.466$ | | | |
| | $d_2 = 3.069$ | | |
| $r_3 = -170.178$ | | | |
| | $d_3 = 2.654$ | $n_2 = 1.80518$ | $\nu_2 = 25.40$ |
| $r_4 = 54.998$ | | | |
| | $d_4 = 10.753$ | | |
| $r_5 = 72.652$ | | | |
| | $d_5 = 6.633$ | $n_3 = 1.58144$ | $\nu_3 = 40.70$ |
| $r_6 = -76.656$ | | | |
| | $d_6 = 20.323$ | | |
| $r_7^* = -21.267$ | | | |
| | $d_7 = 2.654$ | $n_4 = 1.49171$ | $\nu_4 = 57.40$ |
| $a_1 = 0$ | | $b_1 = 0.$ | |
| $a_2 = 8.584793 \times 10^{-7}$ | | $b_2 = 0.$ | |
| $a_3 = -5.929712 \times 10^{-9}$ | | $b_3 = 0.$ | |
| $a_4 = 3.097644 \times 10^{-11}$ | | $b_4 = 0.$ | |
| $a_5 = 1.536608 \times 10^{-15}$ | | $|\Delta \times (0.7r_7)/f| = 5.316 \times 10^{-4}$ | |
| | | $|\Delta \times (0.5r_7)/f| = 7.490 \times 10^{-5}$ | |

EXAMPLE 2

| Focal Length f = 100 | | F-number = 1:3.5 | |
|---|---|---|---|
| Image Angle 2ω = 63.4° | | Back Focal Length = 46.287 | |
| $r_1 = 24.324$ | | | |
| | $d_1 = 7.575$ | $n_1 = 1.62299$ | $\nu_1 = 58.20$ |
| $r_2 = 97.118$ | | | |
| | $d_2 = 2.077$ | | |
| $r_3 = -121.634$ | | | |

-continued

| | | | |
|---|---|---|---|
| $r_4 = 71.875$ | $d_3 = 2.857$ | $n_2 = 1.80518$ | $\nu_2 = 25.40$ |
| $r_5 = 61.748$ | $d_4 = 9.248$ | | |
| $r_6 = -72.560$ | $d_5 = 5.533$ | $n_3 = 1.60342$ | $\nu_3 = 38.00$ |
| $r_7^* = -18.486$ | $d_6 = 13.491$ | | |
| $r_8 = -38.337$ | $d_7 = 2.857$ | $n_4 = 1.49171$ | $\nu_4 = 57.40$ |

| | |
|---|---|
| $a_1 = -4.723277 \times 10^{-3}$ | $b_1 = 7.668476 \times 10^{-5}$ |
| $a_2 = -1.116594 \times 10^{-5}$ | $b_2 = -8.079283 \times 10^{-7}$ |
| $a_3 = 7.937741 \times 10^{-8}$ | $b_3 = -1.550163 \times 10^{-9}$ |
| $a_4 = -2.674623 \times 10^{-10}$ | $b_4 = 8.756197 \times 10^{-12}$ |
| $a_5 = -6.168720 \times 10^{-14}$ | $\|\Delta \times (0.7r_7)/f\| = 1.6403 \times 10^{-3}$ |
| | $\|\Delta \times (0.5r_7)/f\| = 4.0760 \times 10^{-4}$ |

EXAMPLE 3

| Focal Length f = 100 | F-number = 1:3.5 |
|---|---|
| Image Angle 2ω = 63.4° | Back Focal Length = 42.888 |

| | | | |
|---|---|---|---|
| $r_1 = 25.374$ | $d_1 = 8.148$ | $n_1 = 1.62299$ | $\nu_1 = 58.20$ |
| $r_2 = 257.506$ | $d_2 = 1.384$ | | |
| $r_3 = -190.781$ | $d_3 = 2.857$ | $n_2 = 1.80518$ | $\nu_2 = 25.40$ |
| $r_4 = 60.902$ | $d_4 = 12.904$ | | |
| $r_5 = 65.657$ | $d_5 = 5.592$ | $n_3 = 1.60342$ | $\nu_3 = 38.00$ |
| $r_6 = -157.816$ | $d_6 = 13.121$ | | |
| $r_7^* = -20.593$ | $d_7 = 2.857$ | $n_4 = 1.49171$ | $\nu_4 = 57.40$ |
| $r_8 = -32.946$ | | | |

| | |
|---|---|
| $a_1 = -7.31674 \times 10^{-3}$ | $b_1 = 6.039290 \times 10^{-5}$ |
| $a_2 = -1.276859 \times 10^{-5}$ | $b_2 = 8.819042 \times 10^{-7}$ |
| $a_3 = 4.480833 \times 10^{-8}$ | $b_3 = 1.273531 \times 10^{-9}$ |
| $a_4 = -1.675822 \times 10^{-10}$ | $b_4 = -6.598211 \times 10^{-12}$ |
| $a_5 = 9.252578 \times 10^{-14}$ | $\|\Delta \times (0.7r_7)/f\| = 1.9239 \times 10^{-3}$ |
| | $\|\Delta \times (0.5r_7)/f\| = 4.4060 \times 10^{-4}$ |

EXAMPLE 4

| Focal Length f = 100 | F-number = 1:3.5 |
|---|---|
| Image Angle 2ω = 63.4° | Back Focal Length = 45.988 |

| | | | |
|---|---|---|---|
| $r_1 = 24.200$ | $d_1 = 7.631$ | $n_1 = 1.62299$ | $\nu_1 = 58.20$ |
| $r_2 = 64.557$ | $d_2 = 2.790$ | | |
| $r_3 = -83.987$ | $d_3 = 2.857$ | $n_2 = 1.80518$ | $\nu_2 = 25.40$ |
| $r_4 = 165.675$ | $d_4 = 9.509$ | | |
| $r_5 = 57.757$ | $d_5 = 6.588$ | $n_3 = 1.60342$ | $\nu_3 = 38.00$ |
| $r_6 = -60.352$ | $d_6 = 11.783$ | | |
| $r_7^* = -20.022$ | $d_7 = 2.855$ | $n_4 = 1.49171$ | $\nu_4 = 57.40$ |
| $r_8 = -47.418$ | | | |

| | |
|---|---|
| $a_1 = -7.92270 \times 10^{-3}$ | $b_1 = 8.663171 \times 10^{-5}$ |
| $a_2 = -1.077759 \times 10^{-5}$ | $b_2 = -7.975899 \times 10^{-7}$ |
| $a_3 = 4.093707 \times 10^{-8}$ | $b_3 = -2.177460 \times 10^{-9}$ |
| $a_4 = -5.164162 \times 10^{-11}$ | $b_4 = 4.784007 \times 10^{-14}$ |
| $a_5 = 1.170928 \times 10^{-14}$ | $\|\Delta \times (0.7r_7)/f\| = 2.621 \times 10^{-3}$ |
| | $\|\Delta \times (0.5r_7)/f\| = 6.633 \times 10^{-4}$ |

EXAMPLE 5

| Focal Length f = 100 | F-number = 1:3.5 |
|---|---|
| Image Angle 2ω = 63.4° | Back Focal Length = 35.113 |

| | | | |
|---|---|---|---|
| $r_1 = 29.407$ | $d_1 = 6.646$ | $n_1 = 1.62299$ | $\nu_1 = 58.20$ |
| $r_2 = 191.432$ | $d_2 = 1.671$ | | |
| $r_3 = -117.630$ | $d_3 = 2.857$ | $n_2 = 1.80518$ | $\nu_2 = 25.40$ |
| $r_4 = 103.042$ | $d_4 = 11.610$ | | |
| $r_5 = 72.040$ | $d_5 = 5.250$ | $n_3 = 1.60342$ | $\nu_3 = 38.00$ |
| $r_6 = -98.119$ | $d_6 = 23.714$ | | |
| $r_7^* = -20.271$ | $d_7 = 2.857$ | $n_4 = 1.49171$ | $\nu_4 = 57.40$ |
| $r_8 = -41.485$ | | | |

| | |
|---|---|
| $a_1 = -6.121587 \times 10^{-3}$ | $b_1 = 2.108068 \times 10^{-4}$ |
| $a_2 = -2.587921 \times 10^{-5}$ | $b_2 = 1.464219 \times 10^{-7}$ |
| $a_3 = 7.742172 \times 10^{-8}$ | $b_3 = -2.253693 \times 10^{-9}$ |
| $a_4 = -3.024633 \times 10^{-10}$ | $b_4 = 1.766612 \times 10^{-11}$ |
| $a_5 = -2.95977 \times 10^{-13}$ | $\|\Delta \times (0.7r_7)/f\| = 3.4155 \times 10^{-3}$ |
| | $\|\Delta \times (0.5r_7)/f\| = 9.3780 \times 10^{-4}$ |

What is claimed is:
1. A compact photographic objective comprising:
from the front,
a first positive meniscus lens convex toward the front and forming a surface toward the rear,
a second negative lens forming a surface toward the front,
a third positive lens,
a fourth negative meniscus lens having a surface concave toward the front, the concave surface being aspheric,
said first, second, third, and fourth lenses together forming a system having an axial direction and a focal length f,
the opposing surfaces of the first and second lenses forming an air lens having a focal length fA, the values f and fA being related so that

$$-1.5f < fA < -0.5f,$$

taking the axial direction an an x-axis, a direction perpendicular to the optical axis as a y-axis, the forward direction of the light as positive, and the intersection of the vertex of one of the lenses and the x-axis as an origin, the aspheric surface being defined by the following formula for the x-axis directional difference Δx between the aspheric surface and an ideal spherical surface, the latter of which contributes to the determination of the focal length:

$$\Delta x = \frac{\left(\frac{1}{r_7^*}\right) y^2}{1 + \sqrt{1 - \left(\frac{y}{r_7^*}\right)^2}} + a_1 y^2 + a_2 y^4 + a_3 y^6 + \ldots$$

$$+ b_1 y^3 + b_2 y^5 + \ldots - \frac{\left(\frac{1}{r_7}\right) y^2}{1 + \sqrt{1 - \left(\frac{y}{r_7}\right)^2}}$$

where $r_7$ is the radius of curvature of the paraxial region of the front surface of the 4th lens; $r_7^*$ is the radius of curvature of the reference spherical surface of the lens defined by $r_7 = 1/(1/r_7^* + 2a)$; ai are the even coefficients of the aspheric surface; and bi are the odd coefficients of the aspheric surface, whereby letting $\Delta x\, (0.7r_7)$ denote the value of $\Delta x$ at the height $r_7 \times 0.7$ in y coordinate, and $\Delta x(0.5r_7)$ the value of $\Delta x$ at the height of $r_7 \times 0.5$, and the condition $$4.5 \times 10^{-4} < \left| \frac{\Delta x(0.7r_7)}{f} \right| < 4.0 \times 10^{-3}$$

$$6.5 \times 10^{-5} < \left| \frac{\Delta x(0.5r_7)}{f} \right| < 1.0 \times 10^{-3}$$

$$0.1 < \frac{D_6}{f} < 0.25$$

being satisfied.

2. A compact photographic objective according to claim 1, wherein said second lens is a negative lens in bi-concave form, and the said third lens is a positive lens in bi-convex form.

3. A compact photographic objective according to claim 1, wherein said fourth lens is made of a synthetic resin.

4. A compact photographic objective according to claim 1, further satisfying the following conditions:

$$0.6 < \frac{F_{123}}{|F_4|} < 1.1$$

where $F_{123}$ is the overall focal length of the 1st lens, said 2nd lens and said 3rd lens; $F_4$ is the focal length of said 4th lens; and $D_6$ is the axial air separation between said 3rd and said 4th lenses.

5. An objective as in claims 1, 2, 3, or 4, wherein the origin is the intersection of the vertex of the front surface of the fourth component and the x-axis.

* * * * *